(12) United States Patent
Hires

(10) Patent No.: US 10,615,618 B1
(45) Date of Patent: Apr. 7, 2020

(54) DOCK FOR SECURING AN ELECTRONIC DEVICE

(71) Applicant: George Hires, North Bend, WA (US)

(72) Inventor: George Hires, North Bend, WA (US)

( * ) Notice: Subject to any disclaimer, the term of this patent is extended or adjusted under 35 U.S.C. 154(b) by 0 days.

(21) Appl. No.: 15/433,348

(22) Filed: Feb. 15, 2017

Related U.S. Application Data

(60) Provisional application No. 62/338,083, filed on May 18, 2016.

(51) Int. Cl.
  *H02J 7/00* (2006.01)
  *G06F 1/16* (2006.01)
  *G06F 3/041* (2006.01)

(52) U.S. Cl.
  CPC .......... *H02J 7/0044* (2013.01); *G06F 1/1613* (2013.01); *G06F 3/041* (2013.01)

(58) Field of Classification Search
  CPC .................................................... H02J 7/0044
  USPC ................................................. 320/107, 114
  See application file for complete search history.

(56) References Cited

U.S. PATENT DOCUMENTS

| | | | |
|---|---|---|---|
| 8,109,580 B1 * | 2/2012 | Didier ................... | G09F 19/22 312/245 |
| 8,369,082 B2 | 2/2013 | Madonna et al. ....... | 361/679.41 |
| 9,310,020 B1 * | 4/2016 | Bernards .............. | F16M 11/041 |
| 2012/0033375 A1 * | 2/2012 | Madonna ............. | F16M 11/041 361/679.43 |
| 2015/0049452 A1 * | 2/2015 | Franck ................... | H05K 7/14 361/809 |
| 2016/0118861 A1 * | 4/2016 | Gabriel ................ | H02K 7/1861 320/114 |

OTHER PUBLICATIONS

Davies, Chris, "ThinkFlood motorized in-wall iPad dock hands-on", http://www.slashgear.com/contro14-motorized-in-wall-ipad-dock-hands-on-14218306/, Mar. 14, 2012, 5 pages.
"iPanel™ In-Wall Docking Station for iPad®", Chrestron, Date—2012, 2 pages.
"iPort CMIW2000 Control Mount for iPad", https://www.amazon.com/iPort-CMIW2000-Control-Mount-White/dp/B0046LWK3E/ref=sr_1_1?ie=UTF8&qid=1 496863687&sr=8-1&keywords=B0046LWK3E, amazon.com, Oct. 22, 2009, 4 pages.
"In-Wall iPad Mount for iPad 2, 3, and 4", https://www.amazon.com/Wall-iPad-Mount/dp/B00GUDAFS8/ref=sr_1_1?ie=UTF8&qid=1496863755&sr=8-1&keywords=B00GUDAFS8, amazon.com, Nov. 22, 2013, 8 pages.
"In-Wall iPad Mount for iPad Mini", https://www.amazon.com/-Wall-iPad-Mount-Mini/dp/B00GUDZKLU/, amazon.com, Nov. 22, 2013, 7 pages.

* cited by examiner

*Primary Examiner* — Edward Tso
*Assistant Examiner* — Ahmed H Omar
(74) *Attorney, Agent, or Firm* — Christopher P. Maiorana, PC

(57) ABSTRACT

An apparatus comprising a bezel, a backplate and a faceplate. The bezel may be configured to provide side support and bottom support for a portable computing device. The backplate may be configured to mount to a surface. The faceplate may be configured to be removably inserted in the apparatus. The bezel and the faceplate may provide a snug fit for the portable computing device within the apparatus. The portable computing device may be configured to rest on the faceplate. The front of the portable computing device may be exposed when inserted in the apparatus.

20 Claims, 12 Drawing Sheets

DOCK FOR SECURING AN ELECTRONIC DEVICE

This application relates to U.S. Provisional Application No. 62/338,083, filed May 18, 2016, which is hereby incorporated by reference in its entirety.

FIELD OF THE INVENTION

The invention relates to a wall mount generally and, more particularly, to a method and/or apparatus for implementing a dock for securing an electronic device.

BACKGROUND

Portable computing devices are becoming increasingly popular. Apps for portable computing devices can be used to provide an interface to control numerous functions or devices. Portable computing devices may be implemented to provide home automation, security and/or entertainment (i.e., a Sonos music system). Some of these functions or devices are currently controlled using proprietary keypads or touchscreens that are expensive and inconvenient for users. With the release of portable computing devices like the iPad or Android-based tablets, there is the potential to replace all hardware touchscreens that were being used in the home automation, automotive, marine, multi-room music and security industries.

Many portable computing devices lack an in-wall solution. By being portable, portable computing devices can be misplaced, and rely on battery power. When portable computing devices are integral to controlling functions and devices around the home, business, boat and/or automobile, portable computing devices need to be charged and readily available for use by multiple members of a household. Mounting a portable computing device may solve some of the problems but few options exist. If a portable computing device is mounted as a centerpiece in a home, the portable computing device should be accompanied by a mounting option with a sleek design and easy, flexible installation for in-wall control.

It would be desirable to implement a dock for securing an electronic device.

SUMMARY

The invention concerns an apparatus comprising a bezel, a backplate and a faceplate. The bezel may be configured to provide side support and bottom support for a portable computing device. The backplate may be configured to mount to a surface. The faceplate may be configured to be removably inserted in the apparatus. The bezel and the faceplate may provide a snug fit for the portable computing device within the apparatus. The portable computing device may be configured to rest on the faceplate. The front of the portable computing device may be exposed when inserted in the apparatus.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a dock for securing an electronic device that may (i) allow a tablet computing device to be mounted flat in a wall, a desk, a dashboard, etc., (ii) allow a tablet computing device to removed, (iii) be implemented without covering the face of the tablet, (iv) implement a magnet to help hold the device in place, (v) be installed without a wall stud, (vi) be installed with a wall stud, (vii) implement a low-cost, semi-permanent in-wall touchscreen solution, (viii) prevent the portable computing device from being inadvertently knocked loose and/or (ix) be implemented using one or more plastic pieces.

Figure 1:
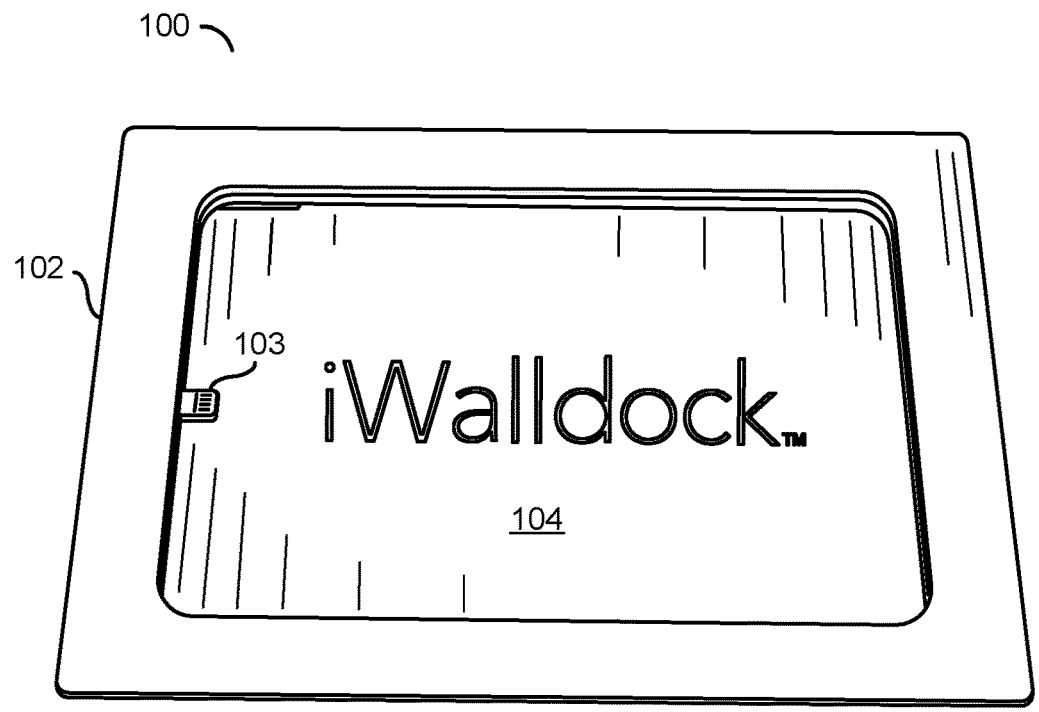
FIG. 1 is a diagram illustrating an example embodiment.

Referring to FIG. 1, a diagram illustrating an example embodiment of the apparatus 100 is shown. The apparatus 100 may be configured to mount a portable computing device. The portable computing device may be mounted flush in a wall using the apparatus 100. Mounting the portable computing device flush in the wall may provide convenient touchscreen control. In an example, the apparatus 100 may enable the portable computing device to be mounted at a height convenient for a user to control (e.g., interact with a touchscreen interface of the portable computing device). In another example, the apparatus 100 may enable the portable computing device to be mounted for prominent display. In yet another example, the apparatus 100 may enable the portable computing device to be mounted in a room and/or location desired in a home or business (e.g., a desk, a podium, a wall, etc.).

The apparatus 100 is shown without the portable computing device installed. The apparatus 100 may comprise a bezel 102, a connector 103 and a plate 104. The bezel 102 may be a trim (or border) for the apparatus 100. The connector 103 may be a male connector. The plate 104 may be a faceplate. The faceplate 104 may be removably attached to (e.g., inserted in) the apparatus 100. The faceplate 104 may be configured to fit within the bezel 102 of the apparatus 100 (e.g., the bezel 102 may be a frame around the faceplate 104 and/or the portable computing device). The apparatus 100 may be implemented such that the bezel 102 does not cover any part of the portable computing device (e.g., the entire front surface of the portable computing device may be exposed).

The bezel 102 may be configured to be mounted against a wall and/or other surface (e.g., a table, a counter top, a desk, etc.). In some embodiments, the bezel 102 may be positioned on top of the surface. For example, a backside of the bezel 102 may abut the wall and bezel 102 may rest on top of a portion of the wall. In some embodiments, the edge of the bezel 102 may meet the surface. For example, the bezel 102 may be flush with the wall.

The portion of the apparatus 100 having the faceplate 104 may be inset from the bezel 102. For example, the portion of the apparatus 100 having the faceplate 104 may be inset a depth corresponding to the thickness of the portable computing device. When installed, the portable computing device may be flush with the bezel 102. In one example, a distance between the bezel 102 and the faceplate 104 may be approximately 0.285 inches.

The connector 103 may protrude from the bezel 102. In some embodiments, the connector 103 may be configured to provide power to the portable computing device. The connector 103 may be inserted into the portable computing device when the portable computing device is inserted in the apparatus 100. In one example, the connector 103 may be affixed to the faceplate 104. In another example, the connector 103 may be removably attached to the faceplate 104. The type of the connector 103 may be varied according to the design criteria of a particular implementation.

Figure 2:
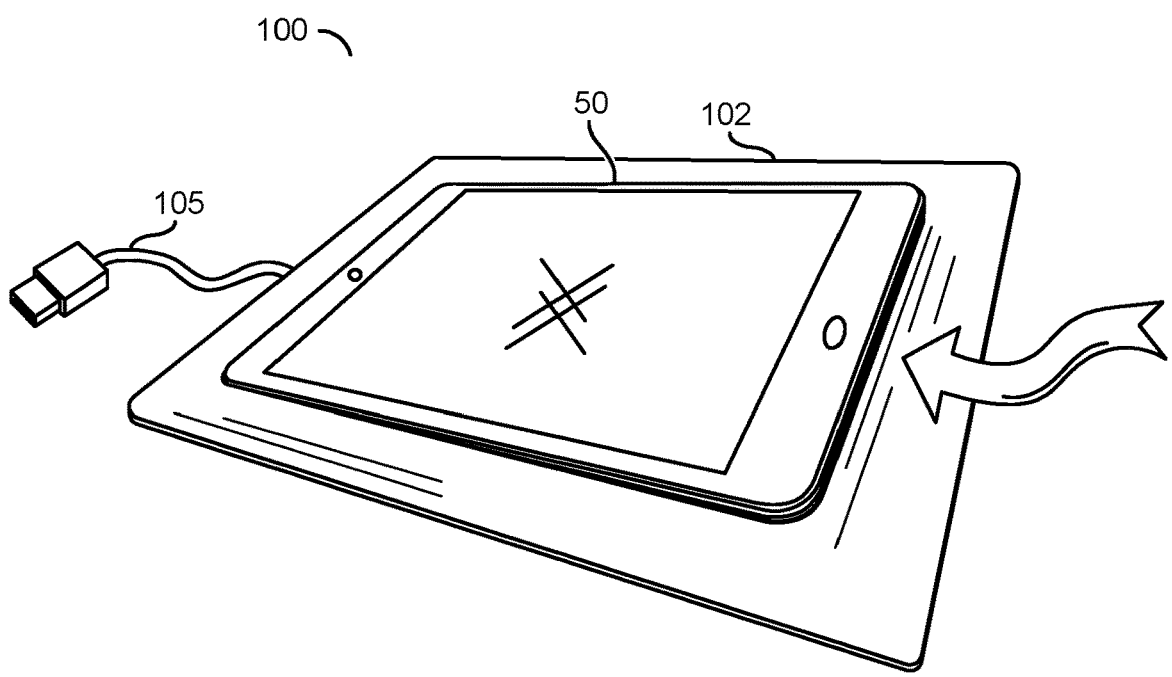
FIG. 2 is a diagram illustrating a portable computing device partially inserted.

Referring to FIG. 2, a diagram illustrating a portable computing device 50 partially inserted into the apparatus 100 is shown. The portable computing device 50 may slide into the apparatus 100. The portable computing device 50 may fit within the bezel 102 and on top of the faceplate 104 (e.g., rest on the faceplate 104). The portable computing device 50 may dock in the apparatus 100 flush with the bezel 102. For example, when the portable computing device 50 is installed, the bezel 102 may be configured to appear as a frame around the portable computing device 50. In one example, the bezel 102 may be a frame extending approximately 0.85 inches on the top and bottom of the apparatus 100 and approximately 0.925 inches on the sides of the apparatus 100. The dimensions of the bezel 102 may be varied according to the design criteria of a particular implementation. The apparatus 100 may be configured to seat the portable computing device 50 flush with the bezel 102. The front of the portable computing device 50 may be fully exposed when inserted in the apparatus 100.

The portable computing device 50 may be a tablet computing device (e.g., an iPad, an Android tablet, a touchscreen device, etc.). In example, the tablet computing device 50 may be an iPad, an iPad mini, a Google tablet, etc. In some embodiments, the portable computing device 50 may be a smartphone. In some embodiments, the portable computing device 50 may be a "phablet". Generally, the front of the portable computing device 50 comprises a touch-capable interface. In some embodiments, the portable computing device 50 may have physical buttons.

The apparatus 100 may be implementing having a particular size form-factor. In an example, the apparatus 100 may be implemented with a form-factor sized for a tablet computing device (e.g., an iPad). In another example, the apparatus 100 may be implemented with a form-factor sized for a smartphone (e.g., an iPhone). In some embodiments, the apparatus 100 may be adjustable (e.g., the apparatus 100 may be adjusted to fit one or more form-factors). In an example, the bezel 102 may be implemented to extend and/or retract (e.g., to allow different sizes of the portable computing device 50 to be inserted). The bezel 102 may have a hole to fit the portable computing device 50. The hole in the bezel 102 may correspond to the size of the portable computing device 50. In one example, the hole in the bezel 50 may be approximately 5.3 inches by 7.865 inches. The size of the portable computing device 50 inserted into the apparatus 100 may be varied according to the design criteria of a particular implementation.

A cable 105 is shown. The apparatus 100 may be configured to hold the cable 105. The cable 105 may connect to a power source (e.g., a wall outlet, a junction box, a power bar, etc.) to provide power to the portable computing device 50. The cable 105 may be an extension of the connector 103 (described in association with FIG. 1). In some embodiments, the cable 105 may be an adapter cable (e.g., to enable one type of connector at one end of the cable 105 and another type of connector for the connector 103). The apparatus 100 may be configured to enable the portable computing device 50 to be secured in the apparatus 100 and align a charging port of the portable computing device 50 to the connector 103, which may receive power via the cable 105. By providing access to the cable 105, the apparatus 100 may ensure the portable computing device 50 is powered (e.g., the portable computing device 50 may not need to be removed to be charged).

Figure 3:
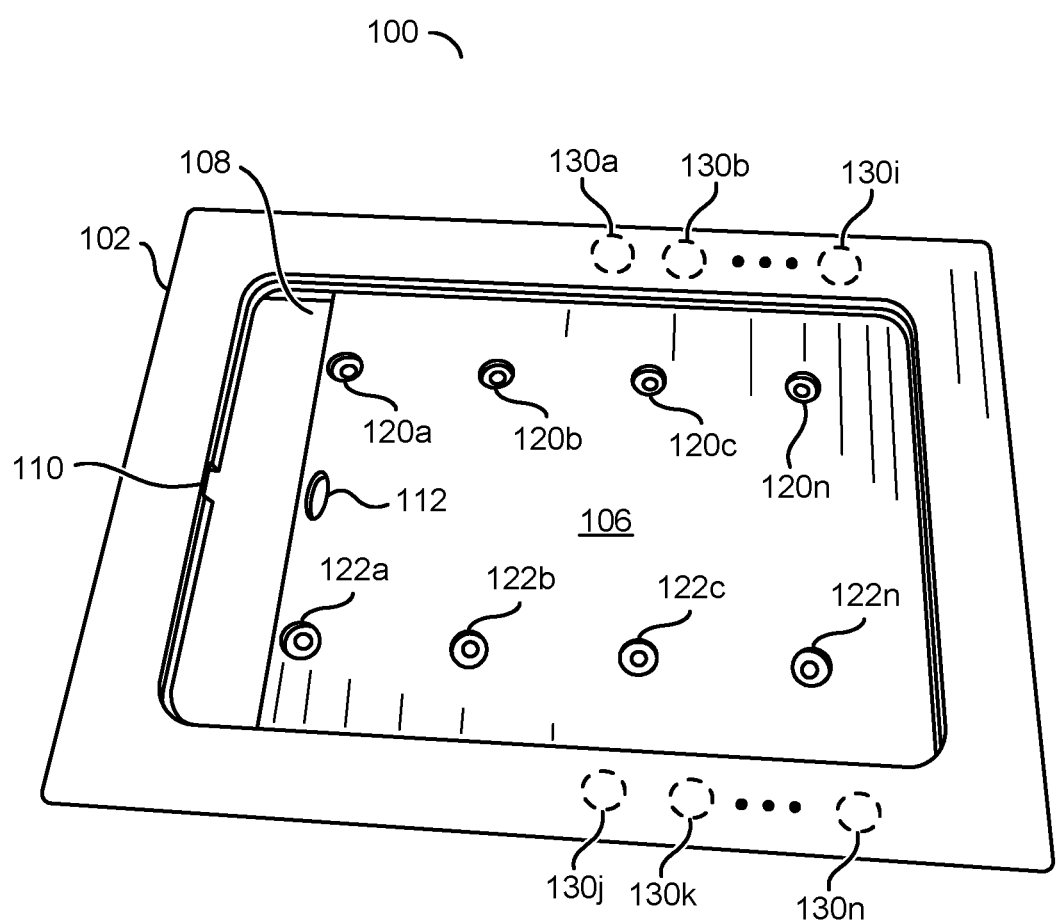
FIG. 3 is another diagram illustrating an example embodiment implementing magnetic securing portions without a faceplate inserted.

The portable computing device 50 may fit snugly within the apparatus 100. A snug fit may prevent the portable computing device 50 from being accidentally knocked out of the apparatus 100. The snug fit may be implemented by the bezel 102 providing side support and bottom support for the portable computing device 50. The portable computing device 50 may rest on the faceplate 104. Referring to FIG. 3, a diagram illustrating an example embodiment of the apparatus 100 implementing magnetic securing portions without the faceplate 104 inserted. A backplate 106 is shown as part of the apparatus 100. The backplate 106 may be attached to the bezel 102. In some embodiments, the bezel 102 and the backplate 106 may be one piece. For example, the bezel 102 and the backplate 106 may be an injection molded part. In some embodiments, the bezel 102 and the backplate 106 may be separate pieces. For example, the bezel 102 may be removably attached to the backplate 106 (e.g., using a strong adhesive).

In some embodiments, the apparatus 100 may comprise a plastic material. For example, the apparatus 100 may comprise layers of plastic each approximately 0.125 inches thick that may be stacked together (e.g., each layer may be routed to form a particular shape, such as the shape of the bezel 102 and/or the shape of the backplate 106, etc.). In some embodiments, various components of the apparatus 100 may comprise different materials. In an example, the backplate 106 and the faceplate 104 may be a plastic material and the bezel 102 may be a metal material (e.g., stainless steel). The apparatus 100 may be implemented in one or more colors (e.g., white, black, stainless steel, etc.) and/or finishes (e.g., glossy, matte, etc.). In some embodiments, the color of the apparatus 100 may be changed (e.g., skins may be available). The material and/or color of the apparatus 100 may be varied according to the design criteria of a particular implementation.

A gap 108 is shown on one side of the apparatus. The gap 108 may be adjacent to the backplate 106. In one example, the gap 108 may be approximately 1.2 inches and the rest of the backplate 106 may be 7.735 inches and both the backplate 106 and the gap 108 may be approximately 5.3 inches tall. The gap 108 may be configured to aid in ejecting the portable computing device 50. In an example, by pressing on the portable computing device 50 above the location of the gap 108, the portable computing device 50 may tilt down partially into the gap 108 and extend outwards from the apparatus 100 on the opposite end of the apparatus 100 from the gap 108. The gap 108 may be configured to aid in inserting and/or ejecting the faceplate 104. In some embodiments, the gap 108 may be optional (e.g., the apparatus 100 may be configured to allow the portable computing device 50 to be pushed down on one side to pop out the other side without implementing the gap 108).

An opening 110 is shown on an inside edge of the bezel 102. The opening 110 is shown located on a left side of the apparatus 100 (e.g., on one of the short edges of the rectangular bezel 102). Generally, the opening 110 is located on the apparatus 100 to align with the charging port of the portable computing device 50 and/or to align with the gap 108. The location of the opening 110 may be varied on the apparatus 100 based on the model of the portable computing device 50 for which the apparatus 100 is intended.

The opening 110 may be configured to accommodate the cable 105 and/or the plug (or connector) 103 of the cable 105. The opening 110 may be used to secure the cable 105 and/or the connector 103 such that the apparatus 100 is able to provide power to the portable computing device 50, when the portable computing device 50 is inserted. The opening 110 may hold the cable 105 (and the connector 103) in place while being pushed into the charging port of the portable computing device 50.

A hole 112 is shown in the backplate 106. The hole 112 may be implemented to align the faceplate 104 with the backplate 106. In an example, the faceplate 104 may have a notch (to be described in more detail in association with FIG. 6) that may align with the hole 112 when the faceplate 104 is inserted correctly. The location, shape and/or size of the hole 112 may be varied according to the design criteria of a particular implementation.

The backplate 106 may be configured to mount to a surface (e.g., a wall). The backplate 106 may comprise mounting holes 120a-120n and mounting holes 122a-122n (e.g., screw holes). The mounting holes 120a-120n are shown aligned along a straight line (e.g., a row). The mounting holes 122a-122n are shown aligned along a straight line (e.g., a row). In an example, the mounting holes 120a-120n (and similarly the mounting holes 122a-122n) may be approximately 1.935 inches apart. The mounting holes 120a-120n and 122a-122n may be arranged to form respective straight lines (e.g., the mounting hole 120a and the mounting hole 122a may be aligned, the mounting hole 120b and the mounting hole 122b may be aligned, etc.). In an example, the distance between the corresponding mounting holes 120a and 122a may be approximately 3.5 inches apart. While 8 mounting holes are shown, the number of mounting holes 120a-120n and/or 122a-122n may be varied according to the design criteria of a particular implementation.

The mounting holes 120a-120n and/or 122a-122n may be implemented to provide locations for screws used to secure (e.g., fasten) the apparatus 100 to the wall. In one example, the mounting hole 120a and 122a may be aligned with a wall stud and screws may be used to secure the apparatus 100 to the wall stud. In another example, mounting brackets (or supporting members) may be secured using the mounting holes 120a-120n and/or 122a-122n. Not all of the mounting holes 120a-120n and/or 122a-122n are needed to secure the apparatus 100 to the wall. A subset of the mounting holes 120a-120n and/or 122a-122n may be selected by the installer to secure the apparatus 100 to the wall.

The mounting holes 120a-120n and/or 122a-122n may be configured to accept various fasteners. In some embodiments, the mounting holes 120a-120n and/or 122a-122n may be configured to accept standard screws (e.g., wood screws for mounting to a wall stud). In some embodiments, the mounting holes 120a-120n and/or 122a-122n may be configured to accept locking snaps. The type of fasteners used may be varied according to the design criteria of a particular implementation. The mounting holes 120a-120n and/or 122a-122n may be implemented such that the fasteners are flush against the backplate 106 when inserted (e.g., the holes may be implemented with a countersink).

Securing portions 130a-130n may be implemented by the apparatus 100. In one example, the securing portions 130a-130n may be implemented as magnets. The magnets 130a-130n are shown within the bezel 102. In the example shown, the magnets 130a-130n are implemented in the long ends of the rectangular bezel 102 towards one end of the bezel 102. In some embodiments, the magnets 130a-130n may be implemented in the shorter ends of the rectangular bezel 102. In some embodiments, the magnets 130a-130n may be evenly spaced around the bezel 102.

The magnets 130a-130n may be arranged to align with magnets within a cover of the portable computing device 50 (e.g., magnets in an Apple Smart Cover for the iPad). For example, the magnets 130a-130n may be embedded in the backplate 106 to align with a magnetic portion located on a backside of the portable computing device 50 (e.g., the thin faceplate 104 may not interfere with magnetic attraction between the magnets 130a-130n embedded in the backplate 106 and the magnetic portion of the portable computing device 50). The number and/or arrangement of the magnets 130a-130n may be varied according to the design criteria of a particular implementation.

The magnets 130a-130n may be implemented using rare-earth magnets. In an example, the magnets 130a-130n may be neodymium magnets. In the example shown, the magnets 130a-130n have a circular shape. In some embodiments, the magnets 130a-130n may be round (or disk-shaped with an empty center). In some embodiments, the magnets 130a-130n may be a rectangular shape. The size, shape and/or material of the magnets 130a-130n may be varied according to the design criteria of a particular implementation.

The securing portions 130a-130n may be configured to secure the portable computing device 50 (e.g., hold the portable computing device 50 in place when inserted in the apparatus 100). The securing portions 130a-130n may implement a secure hold to prevent the portable computing device 50 from falling out of the apparatus 100 while ensuring the portable computing device 50 can be easily removed by a user. For example, the magnets 130a-130n may prevent the portable computing device 50 from being inadvertently removed from the apparatus 100 (e.g., bumping into the apparatus 100 may not knock out the portable computing device 50). Locating the magnets 130a-130n in the bezel 102 may enable the apparatus 100 to balance the strength of the hold on the portable computing device 50 and the ease of removal of the portable computing device 50.

The apparatus 100 may be implemented to enable an easy installation. The apparatus 100 may have a thin depth. In one example, the apparatus 100 may be approximately 0.6 inches thick (e.g., the distance from the front of the bezel 102 and the back of the backplate 106 may be approximately 0.6 inches thick). The thin depth may enable the apparatus 100 to be installed without finding a wall stud. The thin depth may enable the apparatus 100 to be placed in the desired location (e.g., few restrictions on placement). In some embodiments, the apparatus 100 may be installed using a wall stud. For example, walls studs behind the installation location may provide an easier installation. To install the apparatus 100, the user may cut a hole in the wall (e.g., cut out a portion of drywall, cut out a portion of plaster, etc.) sized for the apparatus 100 and screw the apparatus 100 in place to the wall stud and/or clamp the bezel 102 to the edge of the cut out of the wall.

Figure 4:
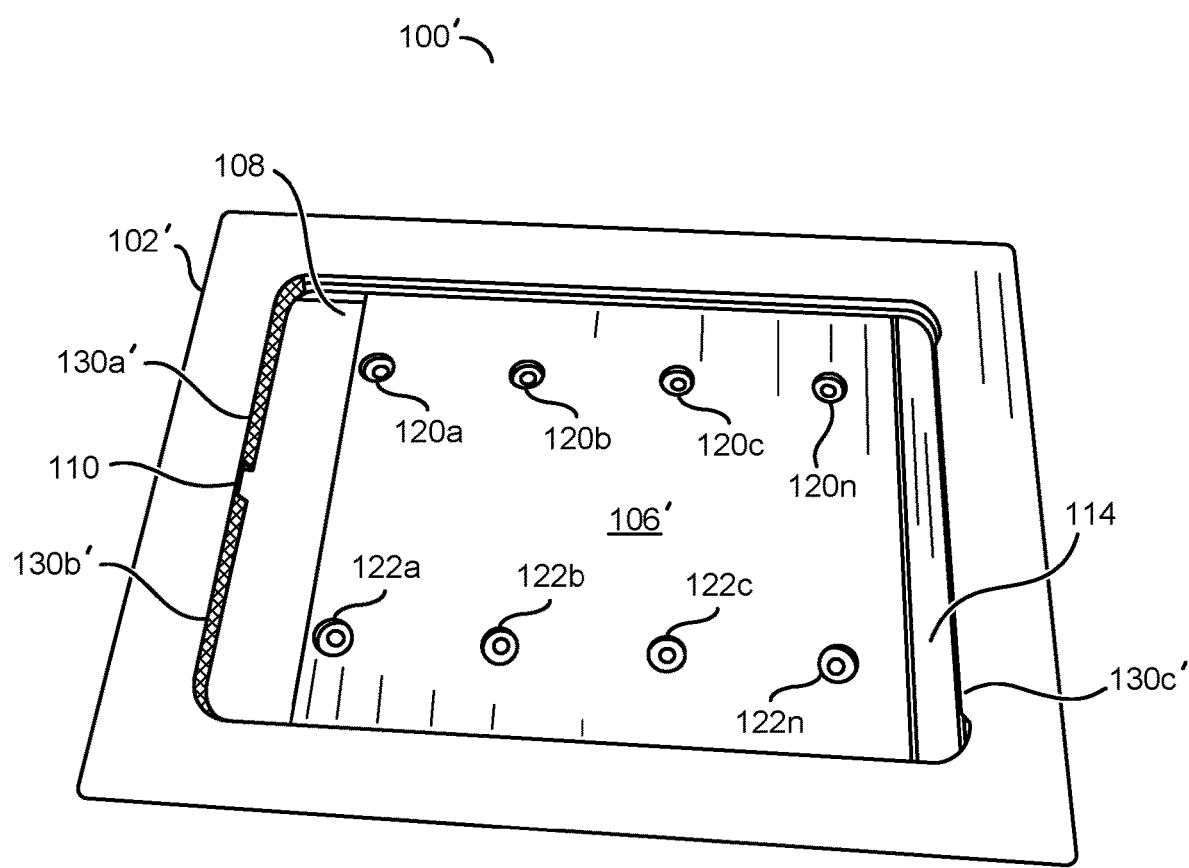
FIG. 4 is a diagram illustrating an alternate example embodiment implementing a foam securing portion.

The apparatus 100 enables fast and easy docking and/or removal of the portable computing device 50 (e.g., the portable computing device 50 may be docked and/or removed in seconds). In an example, applying pressure (e.g., a firm press) on one side of the face of the portable computing device 50 may result in the other side extending outward from the apparatus 100. When the portable computing 50 device extends outwards, a user may grasp and remove the portable computing device 50 from the apparatus 100. Referring to FIG. 4, a diagram illustrating an alternate example embodiment of the apparatus 100' implementing compressible securing portions. The apparatus 100' may comprise the bezel 102', the backplate 106', the gap 108, the opening 110, the mounting holes 120a-120n and/or the mounting holes 122a-122n. The apparatus 100' may further comprise a cutout portion 114 and/or the securing portions 130a'-130c'.

The cutout portion 114 may be implemented as a small slot removed from the backplate 106'. The cutout portion 114 may be implemented on a side of the apparatus 100 opposite to the gap 108. The cutout portion 114 may comprise the small slot with a portion of the backplate 106' remaining (e.g., the cutout portion 114 may be implemented as a removal of one layer of the backplate 106'). The cutout portion 114 may be implemented to provide additional space for the faceplate 104. The additional space for the faceplate 104 implemented by the cutout portion 114 may aid in the removal of the faceplate 104 (e.g., provide more room for the faceplate 104 to bend when removing).

The cutout portion 114 may further implement the securing portion 130c'. The securing portion 130c' may be implemented as a lip for the bezel 102'. The lip 130c' of the bezel 102' may overhang the bezel of the portable computing device 50. The lip 130c' may secure the portable computing device 50 when inserted into the apparatus 100' (e.g., prevent the portable computing device 50 from coming loose). The size of the lip 130c' may be varied according to the design criteria of a particular implementation. For example, the lip 130c' may be smaller than shown in FIG. 4. Generally, the lip 130c' may be implemented to provide a secure hold for the portable computing device 50 while covering as little of the front of the portable computing device 50 as possible.

The securing portions 130a'-130b' may be implemented as a compressible material. In one example, the compressible material may be a foam. In an example, the foam 130a'-130b' may be a compressible foam. The foam 130a'-130b' may be compressed by the portable computing device 50 when being inserted into the apparatus 100'. After insertion of the portable computing device 50, the foam 130a'-130b' may expand to provide a secure hold. Similarly, the foam 130a'-130b' may be compressed when removing the portable computing device 50 from the apparatus 100'.

Implementing the compressible foam 130a'-130b' may allow for the apparatus 100' to expand and/or contract. For example, as room temperature and/or humidity changes, the plastic material of the apparatus 100' may expand and/or contract (e.g., by approximately 3 percent). If the plastic material of the apparatus 100' contracts, the portable computing device 50 may have a looser fit, which may result in the portable computing device 50 being unintentionally knocked out of the apparatus 100'. If the plastic material of the apparatus 100' expands, the portable computing device 50 may become difficult to remove from the apparatus 100'. Since the foam 130a'-130b' may compress and provide a secure hold, the plastic material of the apparatus 100' may change size and the portable computing device 50 may not become stuck.

The foam 130a'-130b' is shown located on one side of the bezel 102'. The lip 130c' may be located on the opposite side of the bezel 102' (e.g., opposite to the foam 130a'-130b'). The foam 130a'-130b' may be located on an inner side of the bezel 102'. In the example shown, the foam 130a'-130b' may be implemented on a short edge of the bezel 102'. For example, the portion of the foam 130a' may be implemented on one side of the opening 110 and the portion of the foam 130b' may be implemented on the other side of the opening 110. The foam 130a'-130b' may be implemented on the side of the apparatus 100' having the gap 108 and the lip 130c' may be implemented on the opposite side with the cutout portion 114.

The compressible material 130a'-130b' may be implemented using a material that compresses when pressure is applied, and expands when the pressure is removed (e.g., expands to approximately the original size and/or shape of the compressible material 130a'-130b' and/or expands to conform to a shape of the portable computing device 50). The compression of the compressible material 130a'-130b' may provide room to enable the portable computing device 50 to be inserted into the apparatus 100'. The expansion of the compressible material 130a'-130b' may provide support to secure the portable computing device 50 in the apparatus 100'. In one example, the compressible material 130a'-130b' may be implemented as a 1/16 inch ethylene-vinyl acetate (EVA) foam. In another example, the compressible material 130a'-130b' may be implemented as a mechanical spring. In yet another example, compressible material 130a'-130b' may be implemented as plastic tabs that provide room for compression. The amount and/or material of the compressible material 130a'-130b' may be varied according to the design criteria of a particular implementation.

The foam 130a'-130b' may be compressed by pushing sideways with inward pressure. The portable computing device 50 may be pushed into the foam 130a'-130b' to compress the foam 130a'-130b'. For example, the foam 130a'-130b' may be compressed slightly to allow the portable computing device 50 to move (e.g., slide) outward beyond the lip 116 of the bezel 102' (e.g., the portable computing device 50 may be pushed down and to the left). The securing portions 130a'-130c' may work together to enable a secure hold for the portable computing device 50.

Figure 5:
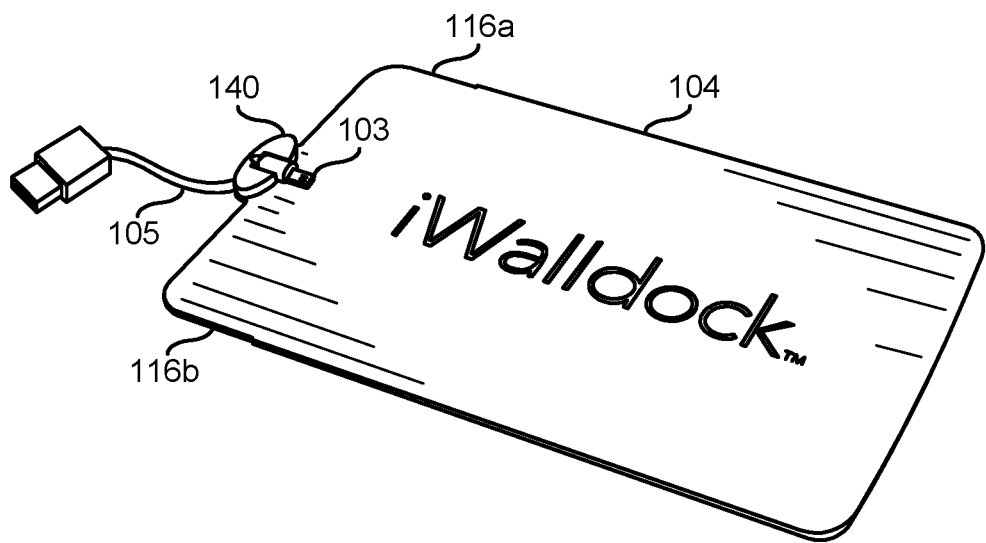
FIG. 5 is a diagram illustrating an inner piece.

Referring to FIG. 5, a diagram illustrating a front side of the faceplate 104 is shown. The front side of the faceplate 104 may optionally have a word and/or logo etched in and/or printed on the material used to form the faceplate 104. The faceplate 104 may comprise notches 116a-116b. The front side of the faceplate 104 may comprise a cable holder 140. The faceplate 104 may removably connect to the bezel 102 and/or the backplate 106 and cover the backplate 106.

The faceplate 104 may be similar in size to the portable computing device 50. In one example, the faceplate may be approximately 5.3 inches by 8.3 inches. The faceplate 104 may be larger than the portable computing device 50 to enable the portable computing device 50 to rest on the faceplate 104 and enable the faceplate 104 to be secured in the apparatus 100. Securing the faceplate 104 may ensure that the faceplate 104 may not be easily removed. A portion of the faceplate 104 may slide under the bezel 102.

The faceplate 104 may be implemented using a flexible material. In an example, the flexible material may be plastic. In some embodiments, the material of the faceplate 104 may be the same material used to implement the apparatus 100. The faceplate 104 may be thin. For example, the faceplate 104 may be thin enough to bend easily. In one example, the faceplate 104 may have a thickness of approximately 0.13 inches.

The faceplate 104 may be configured to bend. In an example, the faceplate 104 may bow (e.g., flex) in the middle (e.g., in the middle of the longer edges along the same axis as the shorter edges, when the faceplate 104 has a rectangular shape). The flexibility of the faceplate 104 may aid the faceplate 104 in sliding and fitting (e.g., inserting) into the apparatus 100. For example, bowing out the faceplate 104 may make installation easier. The bowing of the faceplate 104 may aid in the removal of the portable computing device 50 from the apparatus 100. For example, pressing down on the side of the portable computing device 50 above the gap 108 may cause the faceplate 104 to bow outwards and push the portable computing device 50 out for enough for a user to grab the portable computing device 50 for removal.

The notches 116a-116b may be implemented on each side of one end of the faceplate 104. In the example shown, the notches 116a-116b may be implemented on the left side of the top and bottom (e.g., the long edges) of the faceplate 104. For example, when the faceplate 104 is inserted, the notches 116a-116b may be located above the gap 108. The notches 116a-116n may be located on the side of the faceplate 104 having the cable holder 140. The notches 116a-116n may provide space to prevent cables from jamming.

The cable holder 140 may be configured to hold the cable 105 in place. The cable holder 140 may secure the plug end 103 of a cable (e.g., the cable 105). Securing the plug end 103 of the cable 105 may enable the portable computing device 50 to slide into the apparatus 100 with the plug end 103 of the cable 105 plugging into a charging port of the portable computing device 50. In an example, inserting the portable computing device 50 into the apparatus 100 may also insert the plug end 103 of the cable 105 into the charging port of the portable computing device 50 without additional adjustments. The cable holder 140 may be implemented to ensure the portable computing device 50 receives a power supply when installed in the apparatus 100 (e.g., always charging).

In some embodiments, the cable holder 140 may be shaped to secure the plug 103 of the cable 105. Shaping the cable holder 140 to the shape of the plug 103 of the cable 105 may enable the plug 103 of the cable 105 to be secured such that when the portable computing device 50 is inserted in the apparatus 100, there is enough support to allow the plug 103 to connect to the charging port of the portable computing device 50 (e.g., the force of inserting the portable computing device 50 may not push away the connector 103). In an example, the shape of the cable holder 140 may be configured to secure a USB style plug 103. In another example, the shape of the cable holder 140 may be configured to secure other styles of the plug 103 (e.g., Thunderbolt style, Lightning style, etc.). In yet another example, the cable holder 140 may be implemented as a universal holder configured to secure one or more styles of the plug 103. In some embodiments, the cable holder 140 may have a hole to feed through the cable 105 and the plug end 103 of the cable 105 may be secured by the opening 110 when the faceplate 104 is installed. The implementation of the cable holder 140 may be varied according to the design criteria of a particular implementation.

Figure 6:
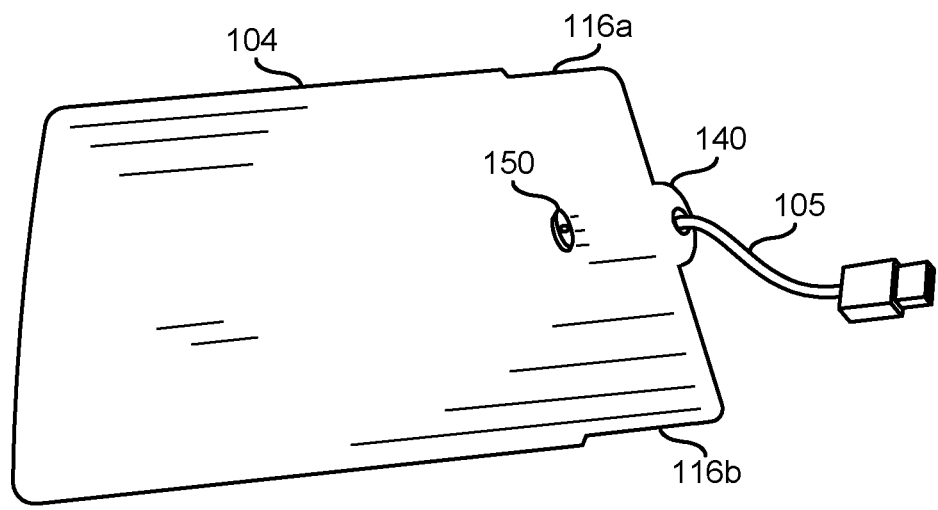
FIG. 6 is a diagram illustrating an alternate view of the inner piece implementing a notch.

Referring to FIG. 6, a diagram illustrating a back side of the faceplate 104 implementing a notch is shown. The back side of the faceplate 104 may comprise the cable holder 140 and a notch 150.

The cable holder 140 is shown having a hole on the back side of the faceplate 104. The cable 105 may be fed through the hole in the cable holder 140. Generally, the hole in the cable holder 140 may be large enough for at least one end of the cable 105 to fit through. The size of the hole may be varied according to the design criteria of a particular implementation.

The notch 150 may be implemented to hold the faceplate 104 in place when inserted in the apparatus 100. The notch 150 may align with the hole 112 on the backplate 106. When the faceplate 104 is inserted in the apparatus 100, the notch 150 may fit in the hole 112. The notch 150 may be implemented to prevent the faceplate 104 from moving. The location, size and/or shape of the notch 150 may be varied according to the design criteria of a particular implementation.

Figure 7:
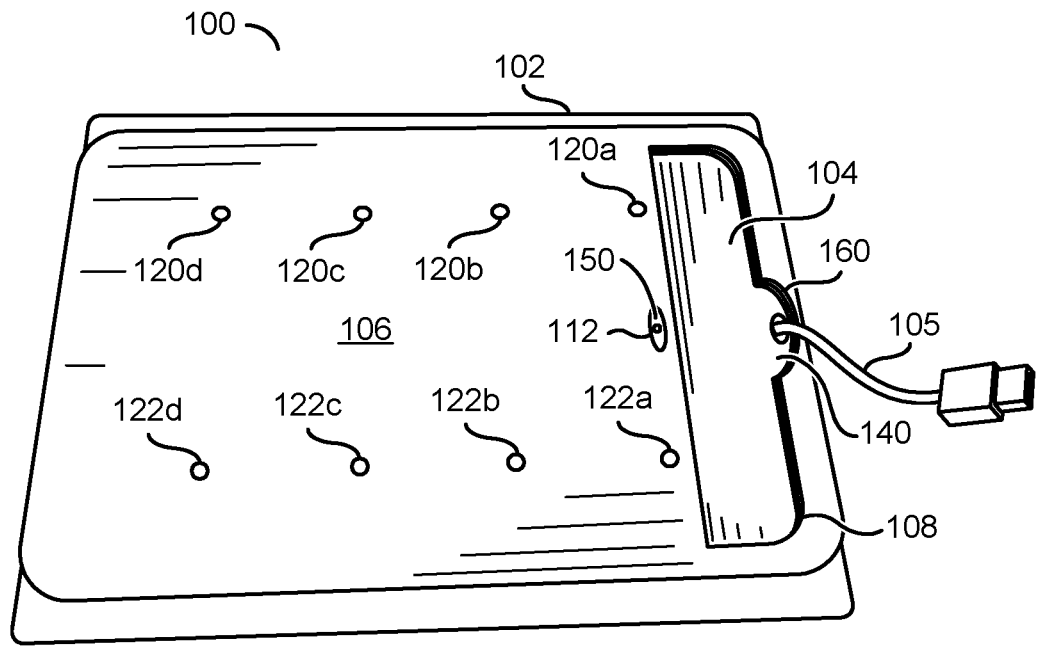
FIG. 7 is a diagram illustrating a backside of an example embodiment showing a cord.

Referring to FIG. 7, a back side of the apparatus 100 is shown. The backplate 106 is shown. The bezel 102 is shown around the backplate 106. In an example, the bezel 102 may extend beyond the backplate 106 by approximately 0.54 inches on the top and the bottom of the apparatus 100 and by approximately 0.22 inches on the left and right side of the apparatus 100. The gap 108 is shown in the backplate 106. The faceplate 104 is shown through the gap 108.

The bezel 102 may be offset from the backplate 106. In an example, the offset (e.g., the distance between the back of the bezel 102 and the back of the backplate 106) may be approximately 0.46 inches (e.g., less than ½ inches). The offset between the bezel 102 and the backplate 106 may correspond to the thickness of the portable computing device 50 (e.g., part of the form-factor for the apparatus 100). The bezel 102 may extend from the apparatus 100 more than the backplate 106 (e.g., have a larger surface). For example, the bezel 102 may be taller and wider than the backplate 106. The larger surface of the bezel 102 than the backplate 106 and the offset between the bezel 102 and the backplate 106 may form a lip behind the bezel 102. The lip may not be visible when the apparatus 100 is installed. A portion of a mounting surface (e.g., drywall) may fit behind the lip of the apparatus 100.

The mounting holes 120a-120d and 122a-122d are shown on the backside of the backplate 106. The mounting holes 120a-120d and 122a-122d may be hidden by the faceplate 104 on the front side of the apparatus 100. The mounting holes 120a-120d and 122a-122d may extend through the backplate 106 to attach to a wall stud and/or mounting brackets (supporting members).

The notch 150 is shown through the backplate 106. The notch 150 is shown locked into the hole 112. Locking the notch 150 of the faceplate 104 into the hole 112 of the backplate 106 may prevent movement of the faceplate 104.

The gap 108 may comprise a cutout 160. The cutout 160 may have a shape corresponding to the shape of the cable holder 140. When the faceplate 104 is installed, the cable holder 140 may align with the cutout 160. The cable holder 140 may be under the bezel 102 when the faceplate 104 is installed. The cutout 160 may be configured to enable the cable holder 140 to be pushed through the gap 108 along with the portion of the faceplate 104 when pressure is applied (e.g., to the portable computing device 50 when installed in the apparatus 100).

Figure 8:
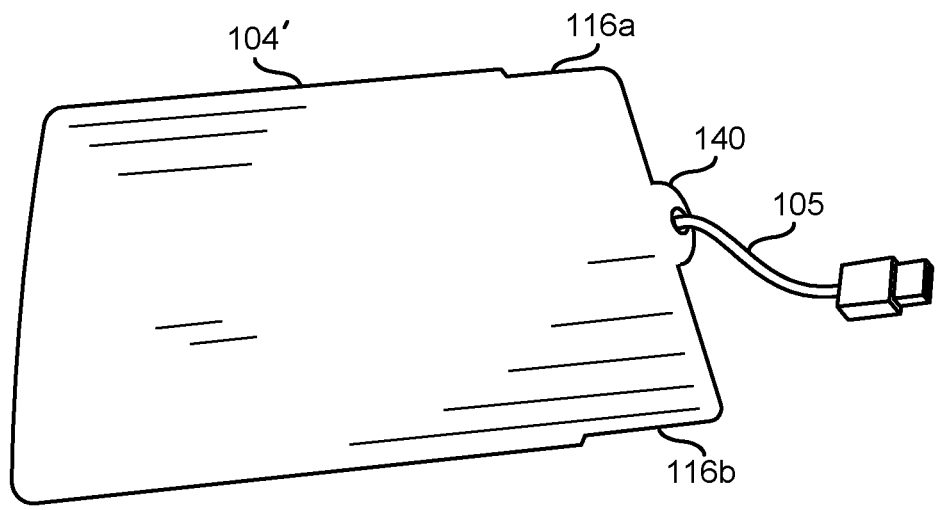
FIG. 8 is a diagram illustrating an alternate implementation of the inner piece.

Referring to FIG. 8, a diagram illustrating a back side of the faceplate 104' is shown. The faceplate 104' may have a similar implementation as the faceplate 104 (described in association with FIG. 6). The faceplate 104' may be implemented without the notch 150.

Figure 9:
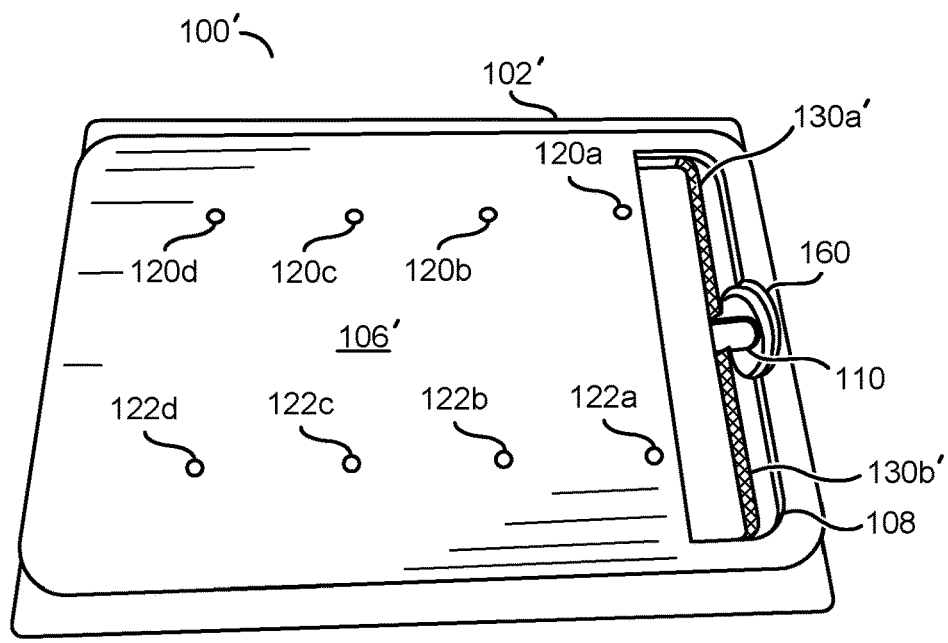
FIG. 9 is a diagram illustrating a backside of the example embodiment implementing a foam securing portion.

Referring to FIG. 9, a diagram illustrating a backside of the example embodiment of the apparatus 100' implementing the foam securing portions 130a'-130b' is shown. The apparatus 100' may have a similar implementation as described in association with FIG. 7. The backplate 106' may not implement the hole 112 (e.g., the faceplate 104' may not implement the corresponding notch 150). In the example shown, the faceplate 104' is not inserted into the apparatus 100'. The cutout 160 is shown on the bezel 102'. The cutout 160 may comprise the opening 110.

The foam securing portions 130a'-130b' may be seen through the gap 108. The foam 130a'-130b' may be a thin strip. In an example, the foam 130a'-130b' may be approximately 0.0625 inches thick. The thickness of the foam 130a'-130b' may be varied according to the design criteria of a particular implementation.

Figure 10:
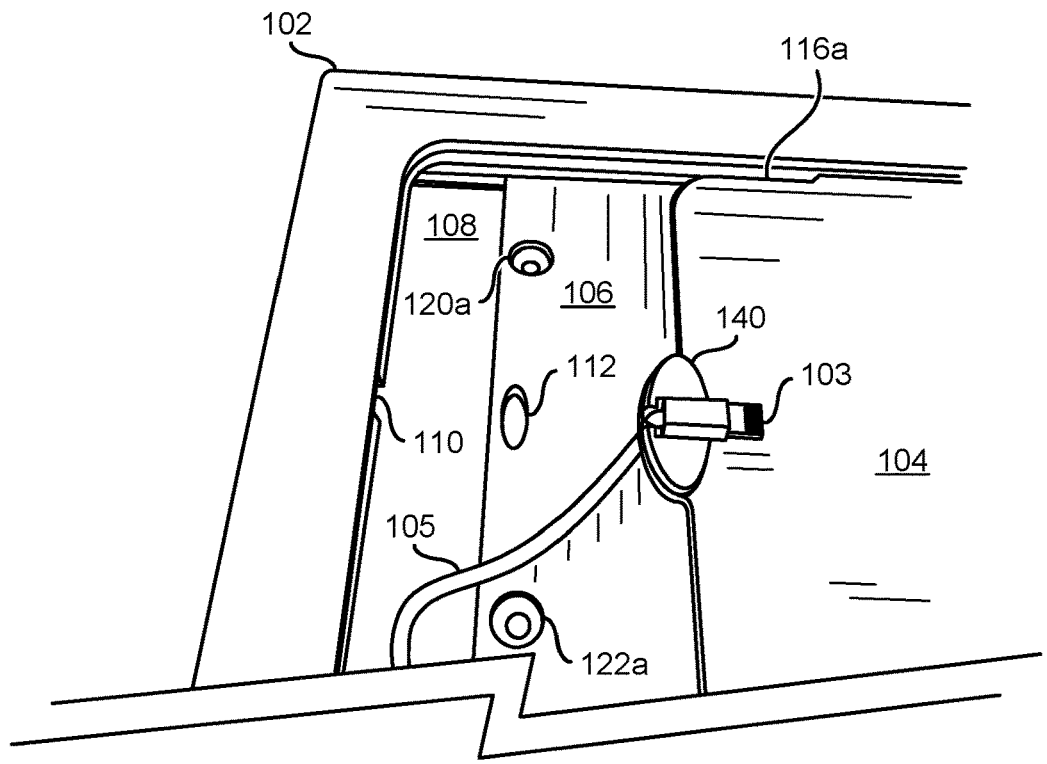
FIG. 10 is a diagram illustrating a more detailed diagram of a connector.

Referring to FIG. 10, a diagram illustrating a more detailed diagram of the connector 103 installed in the apparatus 100 is shown. A portion of the bezel 102 is shown (e.g., an upper left corner of the apparatus 100). The faceplate 104 is shown partially inserted over the backplate 106.

The cable 105 is shown passing through the gap 108 and the cable holder 140. A plug (or connector) 103 is shown secured in the cable holder 140. In some embodiments, a bottom portion of the plug 103 may be within the cable holder 140 (e.g., a cutout having the shape of the plug 103) and a top portion of the plug 103 may be exposed. An end portion of the plug 103 may extend from the cable holder 140 (e.g., to allow the plug 103 to be inserted into a charging port of the portable computing device 50). In the example shown, the plug 103 may be a USB type connector (a male USB Type-A connector, a male mini-USB connector, a male micro-USB connector, a male USB Type-C connector, etc.). In another example, the plug 103 may be a Thunderbolt connector. In yet another example, the plug 103 may be a Lightning connector. The type and/or format of the plug 103 may be varied according to the design criteria of a particular implementation.

When the faceplate 104 is fully inserted, the cable holder 140 may be located under the bezel 102 (e.g., the cable holder 140 may not be visible). The cable holder 140 may be located under the opening 110. The top portion of the plug 103 may be secured by the opening 110. In an example, the bottom portion of the plug 103 may be secured by the cable connector 140 and the top portion of the plug 103 may be secured by the opening 110. In some embodiments, the apparatus 100 may be implemented such that the plug 103 may be held in place by the opening 110 and/or the cable holder 140 to align with the charging port of the portable computing device 50. The contacts of the plug 103 may protrude from the opening 110 of the bezel 102. For example, when the portable computing device 50 is inserted, the opening 110 and/or the cable holder 140 may provide a secure hold to enable the plug 103 to be pushed into the charging port of the portable computing device 50. In some embodiments, the plug 103 may be permanently installed (e.g., to enable a firm connection to the portable computing device 50). For example, the plug 103 may be affixed to the cable holder 140 (e.g., using glue, epoxy, adhesive tape, etc.). The notches 116a-116b may be implemented to prevent the cable 105 from jamming when the faceplate 104 is installed.

The apparatus 100 may be configured to provide low-voltage charging using the plug 103. The apparatus 100 may be configured to hold the plug 103 that may be configured to connect to the portable computing device 50. The plug 103 and the cable 105 may be connected to a charger (not shown). In one example, the plug 103 and/or the cable 105 may be paired with a long distance charger. In another example, the plug 103 and/or the cable 105 may be connected to a short-range charger (e.g., an iPad charger) when the cable 105 is implemented as a USB extension cable up to 6 feet in length. Generally, distances longer than 6 feet for the cable 105 may need a long distance charger. The charger may provide a charging capability to the plug 103 to ensure that the portable computing device 50 is ready for use (e.g., without having to remove the portable computing device 50 from the apparatus 100 for charging).

In some embodiments, the plug 103 may be a USB power connection that charges the portable computing device 50. The connection of the cable 105 to the charging port of the portable computing device 50 may be extended using standard USB extension cables. In an example of the iPad, the limit for the USB extension cable may be 6 feet with the Apple Lightning charging cable (e.g., beyond 5 feet, the iPad 50 may not receive full charging power and may discharge with use over time). If the installation location of the apparatus 100 involves extending the USB power connection greater than 6 feet, a long-distance charger may be used. In an example, a long-distance charger may enable full-power USB charging up to 165 ft using 16/2 inch in-wall speaker wire or 100 ft using two or more pairs of conductors of Cat5e/6 cable. The length limit for the cable 105 and/or additional extension cables may be varied based on charger hardware.

Figure 11:
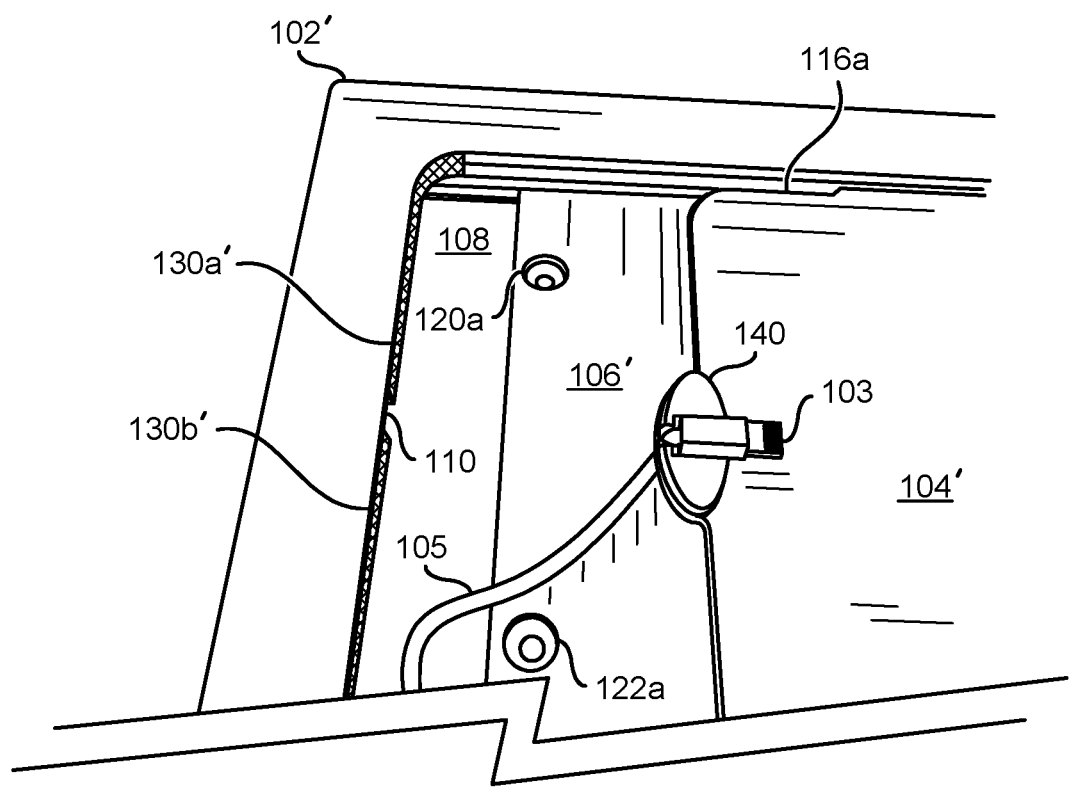
FIG. 11 is a diagram illustrating an alternate implementation with the foam securing portion.

Referring to FIG. 11, a diagram illustrating the alternate implementation with the foam securing portions 130a'-130b' is shown. The foam securing portions 130a'-130b' are shown on the bezel 102'. The faceplate 104' may be inserted into the apparatus 100'. The faceplate 104' may not implement the notch 150. The backplate 106' may not implement the hole 112.

Figure 12:
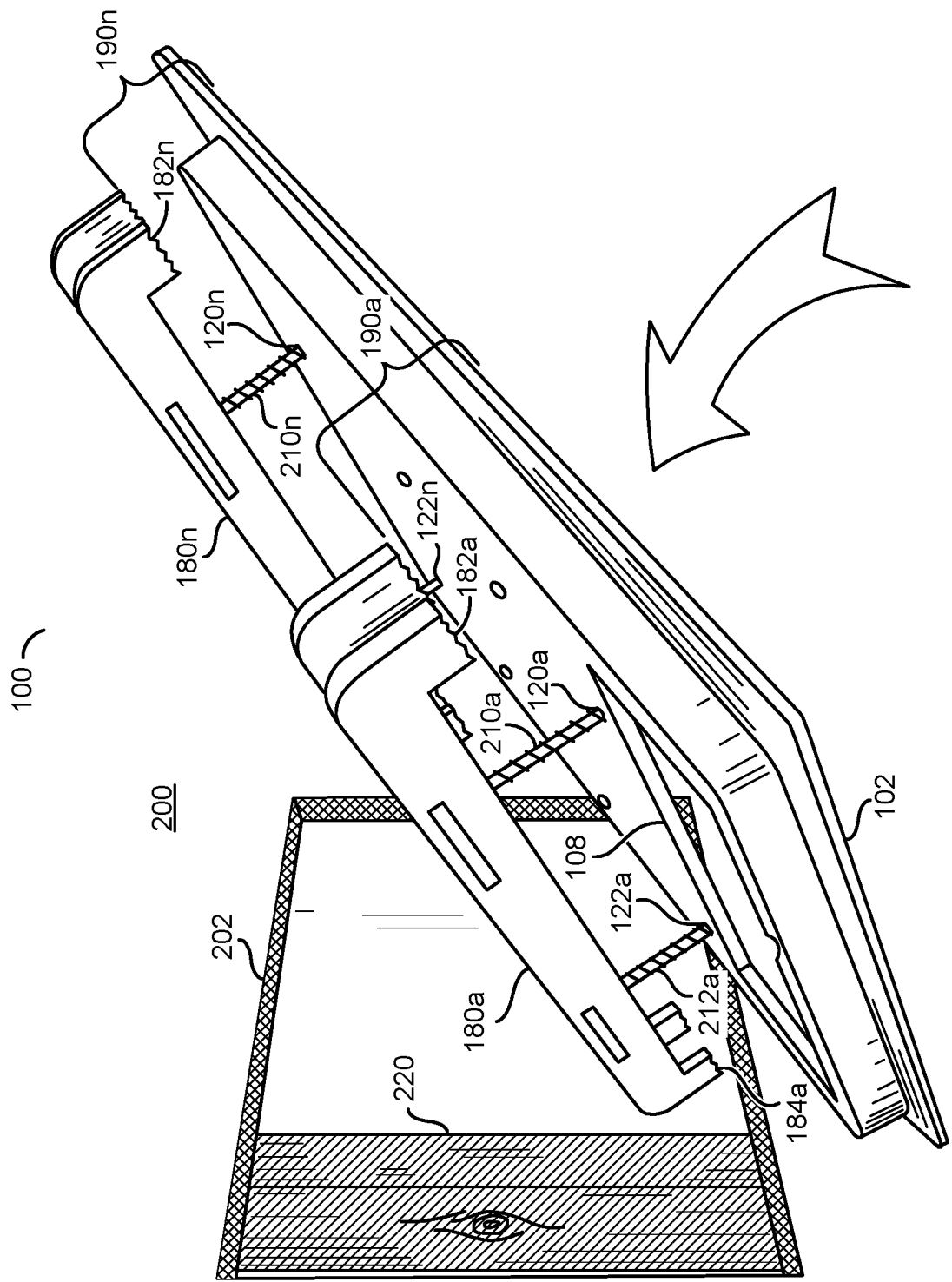
FIG. 12 is a diagram illustrating a supporting member.

Referring to FIG. 12, a diagram illustrating a supporting member is shown. The apparatus 100 is shown near a wall 200. The wall 200 may have a cutout portion 202 (e.g., a wall opening). The cutout portion 202 may be removed from the wall 200 (e.g., using a drywall jab saw) to provide space to install the apparatus 100.

The apparatus 100 is shown tilted forwards. In an example, an installer (e.g., a user) may insert a bottom edge of the apparatus 100 into the cutout portion 202 then insert the top edge of the apparatus 100 for installation. The apparatus 100 may comprise a supporting member 180a and a supporting member 180n. In the example shown, two supporting members 180a-180n are shown. The number of supporting members 180a-180n used for installation may be varied according to the design criteria of a particular implementation.

The supporting members 180a-180n may be configured to clamp the apparatus 100 to the wall 200 in the cutout portion 202. Clamping the supporting members 180a-180n to the wall 200 near the cutout portion 202 may provide support for the apparatus 100. The supporting members 180a-180n may be removably attached to the apparatus 100 and be located behind the backplate 106 and inside the wall 200 when the apparatus 100 is installed. In an example, the supporting members 180a-180n may be approximately 7.5 inches long (e.g., longer than the bezel 102) and 0.74 inches wide.

The supporting members 180a may comprise a top clamping surface 182a and a bottom clamping surface 184a. Similarly, the supporting member 180n may comprise a top clamping surface 182n and a bottom clamping surface 184n. The top clamping surfaces 182a-182n and/or the bottom clamping surfaces 184a-184n are shown having a rough edge (e.g., jagged teeth) to provide grip. In an example, the clamping surfaces 182a-182n and/or 184a-184n may have a length of approximately 0.79 inches and a width of 0.74 inches.

A space 190a is shown between the top clamping surface 182a and the top of the bezel 102. Similarly, a space 190n is shown between the top clamping surface 182n and the top of the bezel 102. The top clamping surfaces 182a-182n may be configured to fit behind the wall 200 when the apparatus 100 is installed. The edge of the wall 200 (e.g., the portion of the wall remaining next to the cutout portion 202) may fit in the spaces 190a-190n (e.g., between the top clamping surfaces 182a-182n and the bezel 102 and in the lip created by the bezel 102 and the offset of the backplate 106). The top clamping surfaces 182a-182n may clamp (e.g., squeeze, grip) the wall 200 with the bezel 102. Clamping the wall 200 between the top clamping surfaces 182a-182n and the bezel 102 may provide support for the apparatus 100. Similarly, the bottom clamping surfaces 184a-184n may clamp the wall 200 to a bottom portion of the bezel 102.

Screws 210a-210n are shown inserted through the respective mounting holes 120a-120n and into the respective supporting members 180a-180n. Similarly, screws 212a-212n are shown inserted through the respective mounting holes 122a-122n and into the respective supporting members 180a-180n. The apparatus 100 may be configured such that the screws 210a-210n and/or 212a-212n may pull the supporting members 180a-180n towards the apparatus 100 to tighten the supporting members 180a-180n against the wall 200 and/or the bezel 102. In an example of installing the apparatus 100, the screws 210a-210n and/or 212a-212n may be extended (e.g., not tightened) to keep the supporting members 180a-180n far enough away from the apparatus 100 to provide the spaces 190a-190n for the wall 200 to fit in. When the apparatus 100 is positioned against the wall 200 in the cutout portion 202, the screws 210a-210n and/or 212a-212n may be tightened to pull the supporting members 180a-180n towards the apparatus 100. Pulling the supporting members 180a-180n towards the apparatus 100 may close the spaces 190a-190n and clamp the wall 200 between the clamping surfaces 182a-182n and the bezel 102. The amount of tightening of the screws 210a-210n and/or 212a-212n to secure the apparatus 100 may be varied according to the design criteria of a particular implementation.

In some embodiments, the apparatus 100 may comprise one or more of the supporting members 180a-180n to secure the apparatus 100 in the wall 200. In one example, two of the supporting members 180a-180n are used to secure the apparatus 100 if the wall 200 is hollow behind the cutout portion 202 (e.g., no wall studs are available). In the example shown, a wall stud 220 is shown within the cutout portion 202 of the wall 200. In some embodiments, if the wall stud 220 is available through the cutout portion 202 that aligns with the mounting holes 120a-120n and/or 122a-122n on the backplate 106, the screws 210a-210n and/or 212a-212n may be attached to the wall stud 220 (e.g., instead of the supporting members 180a-180n). In an example, if there are obstacles inside the wall 200, alternate mounting holes 120a-120n and/or 122a-122n may be used to secure the installation of the apparatus 100 in the cutout portion 202 of the wall 200.

The supporting members 180a-180n may be located on the backside of the apparatus 100. The supporting members 180a-180n may be removably connected to the apparatus 100. In an example, the supporting members 180a-180n may be removably connected to the apparatus using the screws 210a-210n and/or 212a-212n. In another example, the supporting members 180a-180n may be removably connected to the apparatus 100 using snaps. In yet another example, the supporting members 180a-180n may be removably connected to the apparatus 100 using a slide and lock mechanism. The supporting members 180a-180n may be arranged on the back of the apparatus 100 with the screws 210-210n and/or 212a-212n inserted through the backplate 106 and then through the supporting members 180a-180n. The screws 210a-210n may be partially inserted while mounting to allow the user to align the apparatus 100 in the cutout portion 202. The supporting members 180a-180n may be pushed away from the apparatus as far as possible to provide the spaces 190a-190n. The spaces 190a-190n may be used to clamp the wall material.

Figure 13:
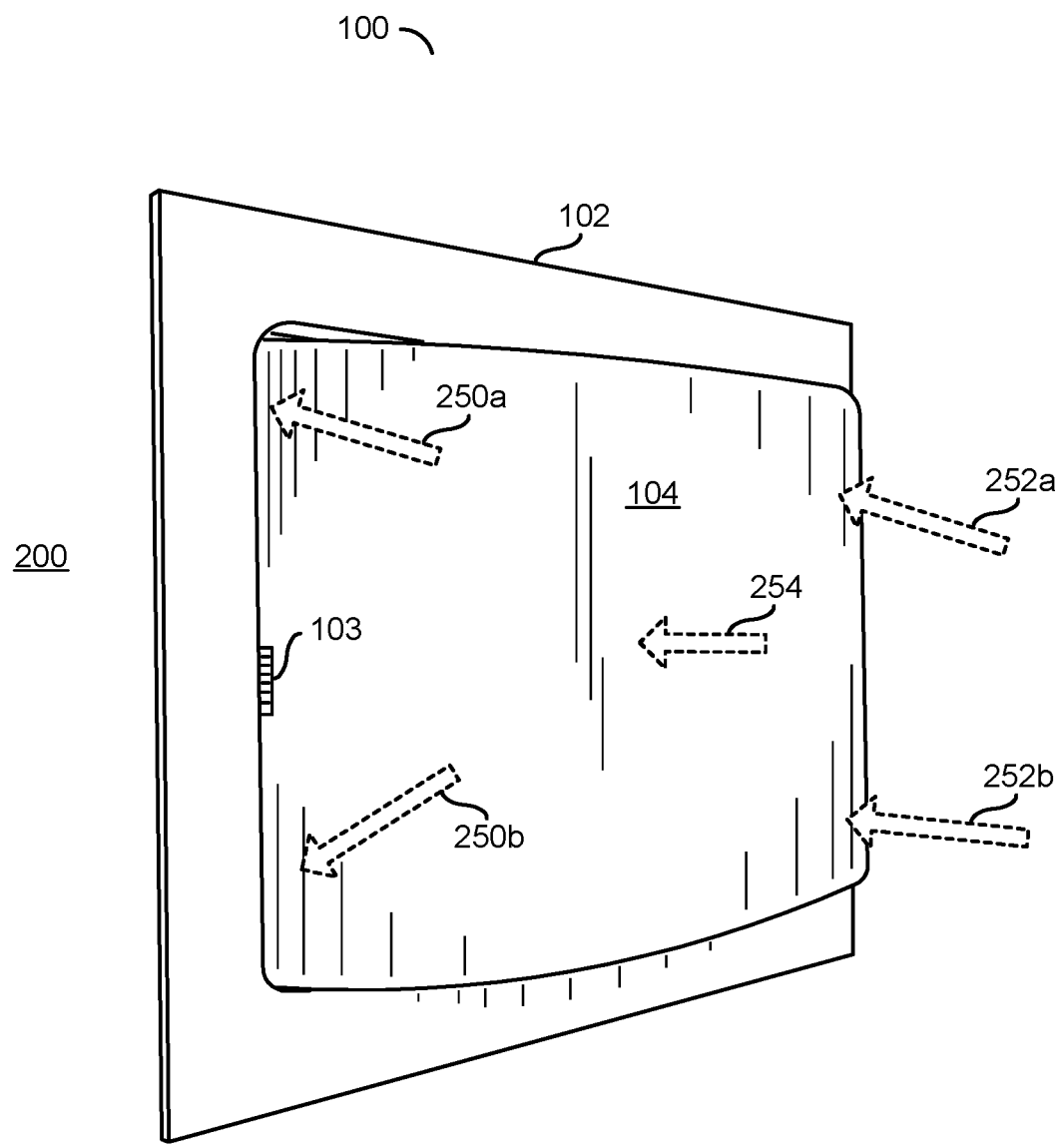
FIG. 13 is a diagram illustrating an installation of a faceplate.

Referring to FIG. 13, a diagram illustrating an installation of the faceplate 104 is shown. The apparatus 100 is shown mounted to the wall 200 (e.g., in the cutout portion 202). The faceplate 104 is shown being inserted between the bezel 102.

The faceplate 104 may comprise a flexible material. In an example, the faceplate 104 may be a thin, plastic material. The flexible material of the faceplate 104 may enable the faceplate 104 to bow (e.g., flex). Flexing the faceplate 104 may aid in attaching the faceplate 104 to the apparatus 100.

One edge of the faceplate 104 may be inserted in the apparatus 100. In the example shown, the left side of the faceplate 104 may be inserted first. The connector 103 is shown. The connector 103 (and the cable 105) may be inserted through the gap 108 as the faceplate 104 is inserted. Arrows 250a-250b are shown on the left side of the faceplate 104. The arrow 250a may be directed at a top left edge of the faceplate 104. The arrow 250b may be directed at a bottom left edge of the faceplate 104. The arrows 250a-250b may represent where the installer may apply pressure in a first stage of inserting the faceplate 104.

Next, another edge of the faceplate 104 may be inserted in the apparatus 100. In the example shown, the right side of the faceplate 104 may be inserted second. Arrows 252a-252b are shown on the right side of the faceplate 104. The arrow 252a may be directed at a top right edge of the faceplate 104. The arrow 252b may be directed at a bottom right edge of the faceplate 104. The arrows 252a-252b may represent where the installer may apply pressure in a second stage of inserting the faceplate 104.

The faceplate 104 is shown bowing outwards from the apparatus 100. The faceplate 104 may be sized to have a tight fit in the apparatus 100. Flexing the faceplate 104 may enable an easy installation of the faceplate 104 in the apparatus 100. In an example, the installer may insert the left side of the faceplate 104, then bend the faceplate 104 to insert the right side of the faceplate 104.

After the two sides of the faceplate 104 have been inserted in the apparatus 100, the bowed middle portion of the faceplate 104 may be pushed in. An arrow 254 is shown in the middle of the faceplate 104. The arrow 254 may represent where the installer may apply pressure to snap the faceplate into place (e.g., push the bowed section of the faceplate 104 into the apparatus 100). After pushing the bowed section of the faceplate 104 into the apparatus 100, the faceplate may sit flat against the apparatus 100. Next, the portable computing device 50 may be inserted.

Figure 14:
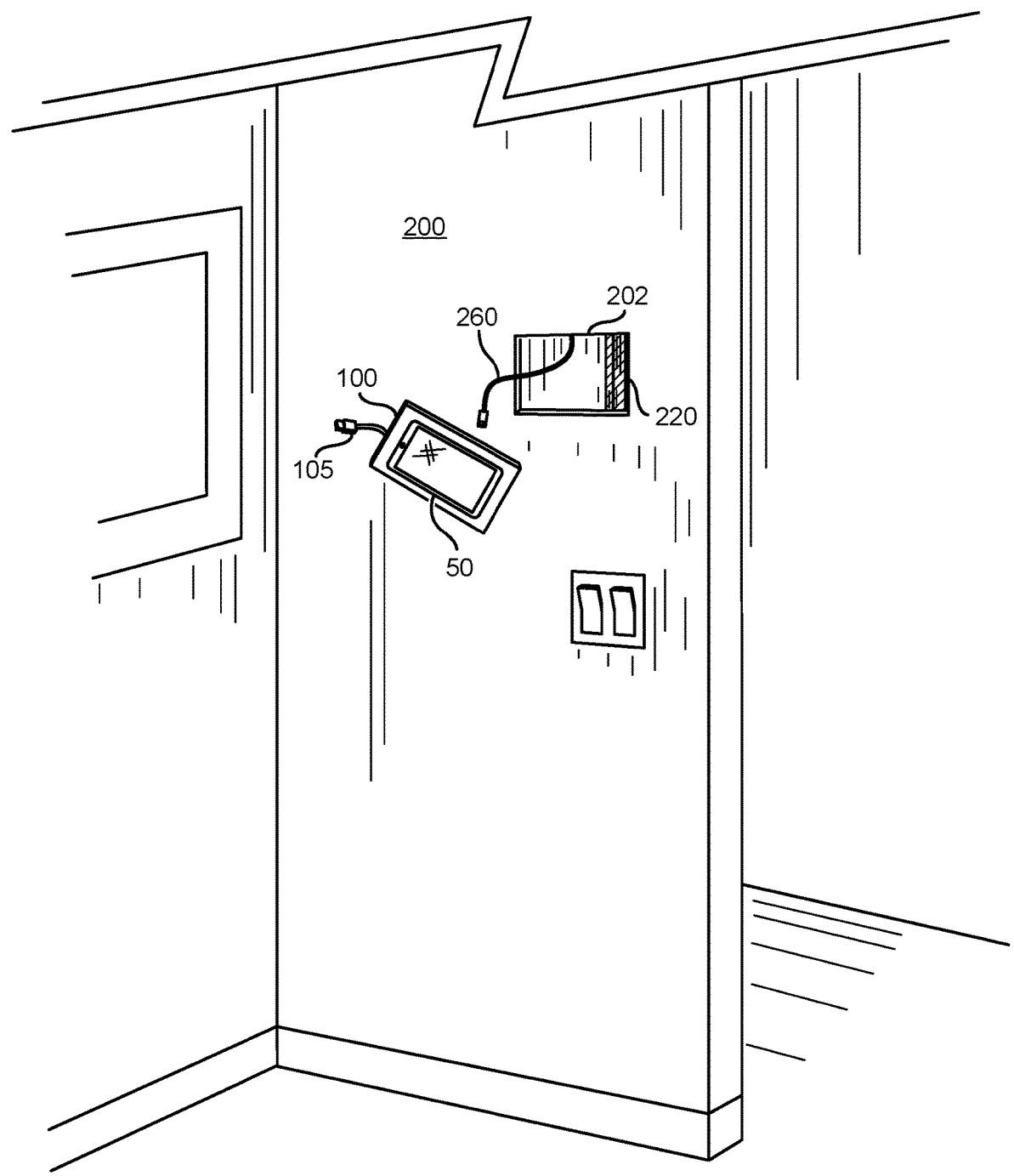
FIG. 14 is a diagram illustrating a partial wall installation.

Referring to FIG. 14, a diagram illustrating a partial wall installation of the apparatus 100 is shown. The cutout portion 202 of the wall 200 is shown. The cable 105 is shown extending from within the wall 200 out of the cutout portion 202. The plug of the cable 105 is shown. In one example, the plug of the cable 105 may be a male connector. The apparatus 100 is shown with the portable computing device 50 inserted. Generally, the portable computing device 50 may not be inserted during the installation of the apparatus 100.

The apparatus 100 may be installed at a desired location. Generally, a desired height for a touchscreen device (e.g., the portable computing device 50) may be 56-60 inches from the floor to the bottom of the screen. Generally, the material of the wall 200 should be smooth and flat (e.g., drywall, wood and/or paneling). In some embodiments, a minimum material depth of the wall 200 may be approximately ½ inches.

A template may be provided with the apparatus 100. The template may generally conform to the size and/or shape of the backplate 106. For example, the template may comprise the gap 108 and/or the mounting holes 120a-120n and/or 122a-122n. The template may be used by the installer to trace a cutout onto the wall 200 and/or determine if a wall stud aligns with the mounting holes 120a-120n and/or 122a-122n. The installer may use a level to draw a horizontal line approximately 6 inches long at the desired height. The template may be used as a guide at the level line. The cutout portion 202 may be made into the wall 200 using an appropriate cutting tool (e.g., along the traced line made with the template). The installer may test fit the apparatus 100 in the cutout portion 202 to ensure a gap-free fit. The installer may remove excess material around the cutout portion 202 to ensure the apparatus 100 rests flat against the wall surface 200.

The apparatus 100 may be inserted into the wall opening 202. In an example, the apparatus 100 may be installed by inserting the apparatus 100 at an angle (e.g., tilting forwards towards the installer as shown in FIG. 12) and sliding the apparatus 100 downwards until the supporting members 180a-180n clear a top of the wall opening 202. The apparatus 100 may slide into place. The screws 210a-210n and/or 212a-212n may be tightened until the supporting members 180a-180n pull tight against the backside of the wall material. If the wall stud 220 is available, the screws 210a-210n and/or 212a-212n may be used to secure the apparatus 100 through the backplate 106 and into the wall stud 220. The backplate 106 may comprise the gap 108. The cable 105 (e.g., a USB cable) may be fed through the gap 108. The other end of the cable 105 may be plugged into a power source (e.g., inside the wall, to a junction box, to an electrical outlet, etc.). In the example shown, a cable 260 may extend from the wall cutout 202. The cable 260 may be configured to connect to the cable 105 (e.g., the cable 260 may have a female connector and the cable 105 may have a male connector). The cable 260 may be configured to provide a power supply. The cable 105 may be connected to the cable 260 and both may be fed into the wall opening 202. The faceplate 104 may inserted into the left side of the opening of the apparatus 100 (e.g., the side with the plug 170). The faceplate 104 may then be pushed to the right side of the apparatus 100 until the faceplate 104 clicks into place.

Figure 15:
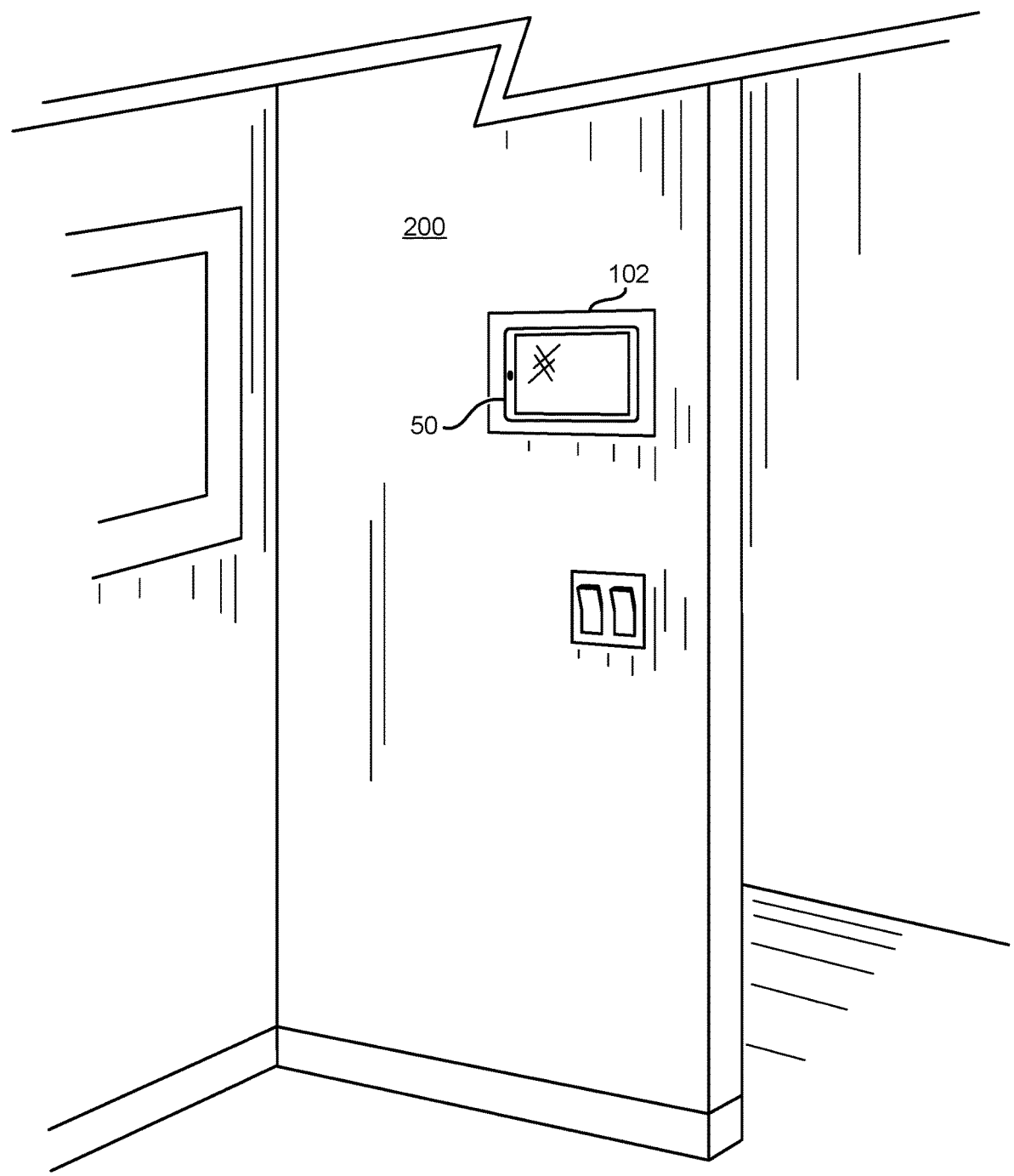
FIG. 15 is a diagram illustrating a completed wall installation.

Referring to FIG. 15, a diagram illustrating a completed wall installation of the apparatus 100 is shown. The apparatus 100 is shown installed in the wall 200. The portable computing device 50 is shown in the apparatus 100. Generally, after installation the bezel 102 may be the portion of the apparatus 100 that is visible when the portable computing device 50 is inserted. In some embodiments, the portable computing device 50 may be installed in the apparatus 100 with the front (e.g., the touchscreen and bezel) of the portable computing device 50 fully exposed (e.g., none of the apparatus 100 covers the front of the portable computing device 50). In some embodiments, the portable computing device 50 may be installed in the apparatus 100' with the touchscreen of the portable computing device 50 fully exposed and a small portion of the bezel of the portable computing device 50 covered. For example, the lip securing portion 130c' may cover a small portion of the bezel of the portable computing device (e.g., less than 0.0625 inches of overlap).

When the apparatus 100 is installed (e.g., secured) in the wall opening 202, the portable computing device 50 may be docked. To dock the portable computing device 50, the installer may align the side of the portable computing device 50 that has a charging port towards the cable connector 103 inside the apparatus 100. The angle of insertion of the portable computing device 50 may be kept close to the wall 200 to ensure proper alignment. The installer may push the portable computing device 50 into the apparatus 100 until the plug 103 of the charging cable 105 held by the apparatus 100 is fully inserted into the charging port of the portable computing device 50. After the plug 103 of the charging cable 105 is inserted, the installer may push the other end of the portable computing device 50 down to fit flush into the apparatus 100 (e.g., flush with the bezel 102). The magnets 130a-130n and/or the securing portions 130a'-130n' may be configured to hold the portable computing device 50 in place.

While the apparatus 100 may be installed in many locations, the user may consider the operating conditions for the portable computing device 50 when installing the apparatus 100. In an example, to protect the portable computing device 50, the user may avoid installing the apparatus 100 in locations that have direct sunlight and/or strong ultraviolet light. In another example, to protect the portable computing device 50, the user may avoid installing the apparatus 100 over heat generating devices and/or in moist areas. In yet another example, to protect the portable computing device 50, the user may avoid mounting the apparatus 100 in locations near electronics that emit radio frequencies and/or electromagnetic interference (e.g., CRT monitors, light dimmers, some power supplies, etc.). In still another example, to protect the portable computing device 50, the user may avoid mounting the apparatus 100 in areas exceeding an operating temperature range of 65° F. to 100° F.

Figure 16:
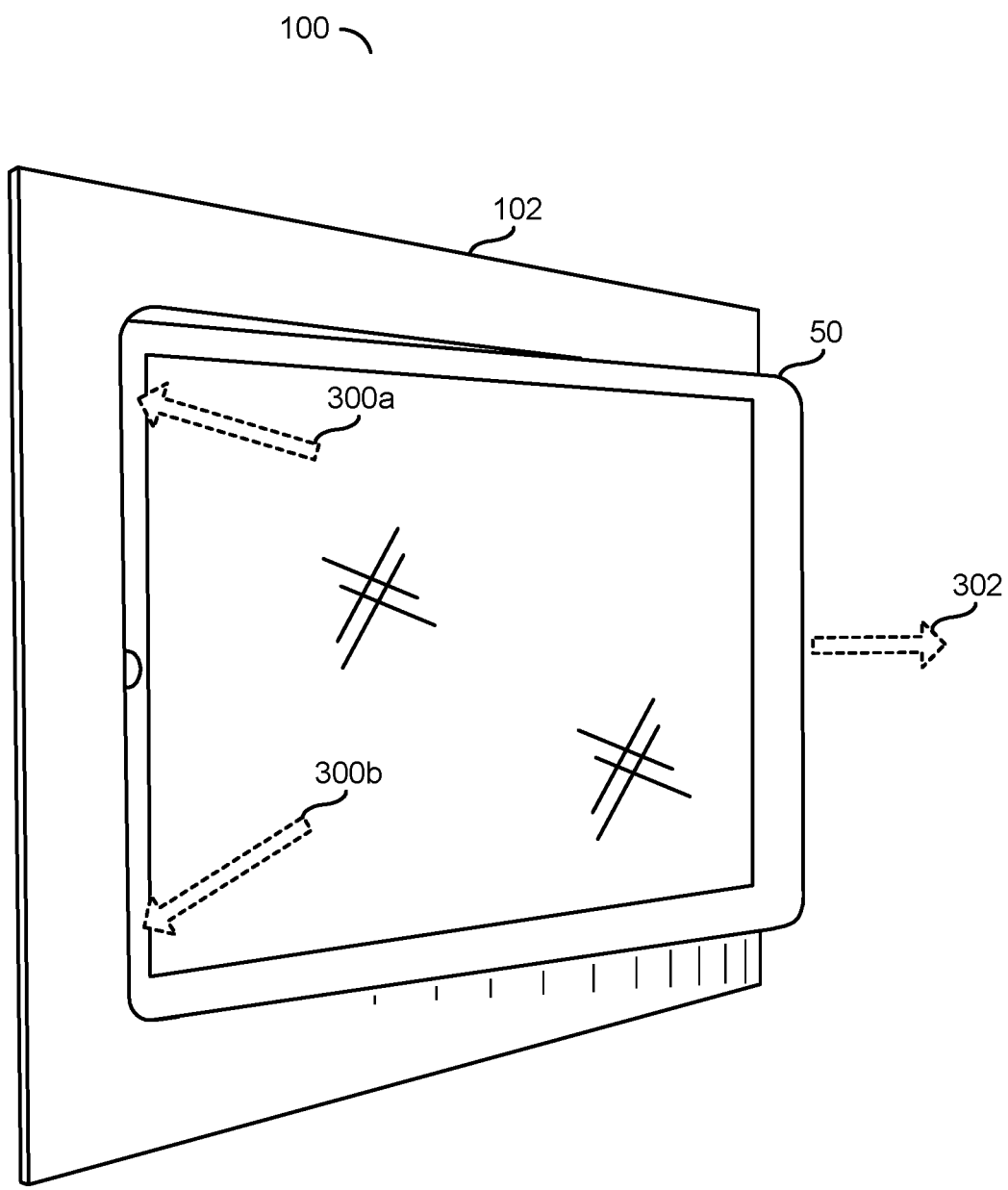
FIG. 16 is a diagram illustrating a removal of a portable computing device from the apparatus.

Referring to FIG. 16, a diagram illustrating a removal of a portable computing device 50 from the apparatus 100 is shown. The apparatus 100 is shown installed and the portable computing device 50 is shown being removed from the apparatus 100.

The portable computing device 50 may be removed from the apparatus 100. The apparatus 100 may be configured to release the portable computing device 50 when the face of the portable computing device 50 is pressed firmly (e.g., with two fingers) on each side of one edge of the portable computing device 50 (e.g., on each side of the 'Home' button with a left hand when the portable computing device 50 is an iPad).

Arrows 300a-300b are shown. The arrows 300a-300b may represent the locations where pressure may be applied to release the portable computing device 50. In an example, the first finger of the left hand of the user may press at the arrow 300a and the thumb of the left hand of the user may press at the arrow 300b. The arrows 300a-300b may generally be located above the gap 108. Applying pressure at the arrows 300a-300b may cause one edge of the faceplate 104 to bend downwards into the gap 108, which may cause other portions of the faceplate 104 to bend outwards causing the portable computing device 50 to be pushed out. Applying pressure at the arrows 300a-300b may cause the foam 130a'-130b' to compress and move the opposite edge of the portable computing device out from under the lip 130c'. The arrows 300a-300b may represent where the user may apply pressure in a first stage of removing the portable computing device 50 from the apparatus 100.

The apparatus 100 may provide a secure hold of the portable computing device 50. Without knowing where to push on the apparatus 100 (e.g., at the arrows 300a-300b), the portable computing device 50 may be difficult to remove from the apparatus 100. The apparatus 100 may protect the portable computing device 50 by preventing inadvertent removal of the portable computing device 50.

Pressing firmly on the portable computing device 50 at the arrows 300a-300b may result in the other side of the portable computing device 50 to spring (e.g., be pushed) outwards. When the portable computing device 50 has been pushed outwards a user may grasp the portable computing device 50. The portable computing device 50 may be pulled in a general horizontal direction away from the cable connector 103 and removed from the apparatus 100. An arrow 302 is shown. The arrow 302 may represent the direction of force for pulling out the portable computing device 50 from the apparatus 100 in a second stage of removing the portable computing device 50 from the apparatus 100.

In some embodiments, suction cups may be provided with the apparatus 100. The suction cups may be used to aid in the removal of the apparatus 100 from the wall 50. The suction cup(s) may be used to provide suction to the faceplate 104 and allow the user to pull the faceplate 104 outwards from the apparatus 100. When inserted, the faceplate 104 may form a tight fit. The tight fit may cause difficulty in removal of the faceplate 104. For example, without knowing where to pull, a person may not be able to release the faceplate 104 from the apparatus 100. The suction cup(s) may be used to aid in the removal of the faceplate 104. The suction cup(s) may grasp and pull the faceplate 104 until the faceplate 104 unclicks. After the faceplate 104 is removed, the apparatus 100 may be removed from the wall 200.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a bezel configured to provide support for edges of a portable computing device;
    a backplate connected to a back of said bezel configured to enable said apparatus to be mounted; and
    a faceplate configured to be removably inserted on top of said backplate, wherein
        (i) said bezel and said faceplate provide a snug fit for said portable computing device within said apparatus,
        (ii) said portable computing device is configured to rest on said faceplate,
        (iii) said faceplate is between said backplate and said portable computing device when said portable computing device is inserted in said apparatus,
        (iv) a front of said portable computing device is (a) fully exposed when inserted in said apparatus and (b) even with a front of said bezel,
        (v) said faceplate is configured to flex when pressure is applied to said portable computing device above a location near an edge of said portable computing device, and
        (vi) flexing said faceplate pushes said portable computing device outwards from said apparatus to enable a user to remove said portable computing device.

2. The apparatus according to claim 1, wherein said portable computing device docks in said apparatus flush with said bezel.

3. The apparatus according to claim 1, wherein said bezel comprises a plurality of securing portions, said securing portions configured to provide a secure hold of said portable computing device.

4. The apparatus according to claim 3, wherein said securing portions comprise magnets.

5. The apparatus according to claim 3, wherein (i) said securing portions comprise a compressible material and a lip and (ii) when inserted in said apparatus (a) a screen of said portable computing device is fully exposed and (b) a device bezel of said portable computing device is partially covered by said lip.

6. The apparatus according to claim 5, wherein said compressible material is a foam material.

7. The apparatus according to claim 5, wherein (i) said compressible material compresses when pressure is applied, (ii) compressing said compressible material enables said portable computing device to move beyond said lip and (iii) moving said portable computing device beyond said lip releases said portable computing device from said apparatus.

8. The apparatus according to claim 1, wherein said faceplate is configured to flex to aid in an insertion of said faceplate in said apparatus.

9. The apparatus according to claim 1, wherein (i) said bezel comprises an opening for a connector, (ii) said faceplate comprises a holder for said connector, (iii) said connector is configured to protrude from said bezel, (iv) said connector is located to align with a charging port of said portable computing device and (v) said apparatus enables a connection between said connector and said charging port when said portable computing device is inserted in said apparatus.

10. The apparatus according to claim 1, wherein (i) said backplate comprises a gap, (ii) said gap is beneath said location near said edge of said portable computing device when said portable computing device is installed and (iii) said gap is configured to enable said faceplate to flex when said pressure applied to said portable computing device is applied to said faceplate corresponding to a location of said gap.

11. The apparatus according to claim 1, wherein said backplate comprises a plurality of mounting holes to enable said apparatus to be mounted securely.

12. The apparatus according to claim 11, wherein said mounting holes are used to fasten said apparatus to a wall stud.

13. The apparatus according to claim 11, wherein (i) said apparatus further comprises one or more supporting members, (ii) said supporting members are removably attached to said apparatus using said mounting holes and (iii) said supporting members are configured to secure said apparatus by clamping a portion of a surface used for mounting said apparatus between said supporting members and said bezel.

14. The apparatus according to claim 1, wherein said front of said portable computing device comprises a touchscreen interface.

15. The apparatus according to claim 1, wherein said snug fit is configured to prevent inadvertently removing said portable computing device.

16. The apparatus according to claim 1, wherein said apparatus is mounted to a wall and said apparatus is configured to be inserted in a cutout portion of said wall.

17. The apparatus according to claim 1, wherein said bezel (i) is offset from said backplate by an amount corresponding to a thickness of said portable computing device, (ii) comprises a hole having a size corresponding to said front of said portable computing device, (iii) has a larger surface than said backplate, (iv) said larger surface and said offset form a lip between said bezel and said backplate and (v) one or more supporting members clamp a portion of a wall in said lip.

18. A method for mounting a portable computing device comprising the steps of:
  (A) mounting a backplate and a bezel;
  (B) feeding an electronic cable through a gap in said backplate and onto a faceplate;
  (C) inserting a first edge of said faceplate onto said backplate, wherein (i) said electronic cable is removably attached to said first edge and (ii) said electronic cable fits is configured to fit into an opening in said bezel;
  (D) inserting a second edge of said faceplate onto said backplate to secure said faceplate;
  (E) inserting a first side of said portable computing device on top of said faceplate, wherein said electronic cable connects to a charging port on said first side of said portable computing device; and
  (F) inserting a second side of said portable computing device on top of said faceplate, wherein (i) said portable computing device rests within said bezel and on top of said faceplate, (ii) said bezel provides support for edges of said portable computing device, (iii) said backplate is connected to a back of said bezel, (iv) said bezel and said faceplate provide a snug fit for said portable computing device, (v) said faceplate is between said backplate and said portable computing device when said portable computing device is inserted on top of said faceplate, (vi) a front of said portable computing device is (a) fully exposed when inserted on top of said faceplate and (b) even with a front of said bezel, (vii) said faceplate is configured to flex when pressure is applied to said portable computing device above a location near an edge of said portable computing device and (viii) flexing said faceplate pushes said portable computing device outwards to enable a user to remove said portable computing device.

19. A method for removing a portable computing device mounted using an apparatus, comprising the steps of:
  (A) applying pressure to one side of said portable computing device, wherein (i) said side of said portable computing device is located at a location of a gap in a backplate of said apparatus, (ii) said backplate is connected to a back of a bezel of said apparatus and (iii) said bezel provides support for edges of said portable computing device;
  (B) bending a first portion of a faceplate of said apparatus into said gap in said backplate in response to said pressure, wherein said portable computing device (a) rests on said faceplate when mounted in said apparatus, (b) is fully exposed when inserted in said apparatus and (c) is even with a front of said bezel;
  (C) flexing a second portion of said faceplate outwards in response to bending said first portion of said faceplate into said gap, wherein (i) flexing said second portion pushes said portable computing device away from said apparatus, (ii) said bezel and said faceplate provide a snug fit for said portable computing device and (iii) said faceplate is between said backplate and said portable computing device when said portable computing device is inserted in said apparatus; and
  (D) pulling said portable computing device from said apparatus, wherein said faceplate pushing said portable computing device away from said apparatus in response to said pressure enables said portable computing device to be removed from said apparatus.

20. The apparatus according to claim 1, wherein (i) said front of said bezel is configured to extend beyond said back of said bezel, (ii) said front of said bezel that extends beyond said back of said bezel is configured to fit onto a surface when said apparatus is mounted, (iii) said back of said bezel and said backplate are configured to fit into a cutout portion of said surface when said apparatus is mounted and (iv) said front of said portable computing device comprises a touchscreen.

* * * * *